(12) United States Patent
Sorbello

(10) Patent No.: US 12,045,828 B2
(45) Date of Patent: *Jul. 23, 2024

(54) SYSTEMS AND METHODS FOR MOBILE PRE-AUTHORIZATION OF A CREDIT TRANSACTION

(71) Applicant: Capital One Services, LLC, McLean, VA (US)

(72) Inventor: Mark Sorbello, Richmond Hill (CA)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/650,945

(22) Filed: Feb. 14, 2022

(65) Prior Publication Data

US 2022/0245636 A1 Aug. 4, 2022

Related U.S. Application Data

(63) Continuation of application No. 16/184,542, filed on Nov. 8, 2018, now Pat. No. 11,250,437.

(51) Int. Cl.
*G06Q 40/00* (2023.01)
*G06Q 20/24* (2012.01)
*G06Q 20/34* (2012.01)
*G06Q 20/40* (2012.01)

(52) U.S. Cl.
CPC ........... *G06Q 20/405* (2013.01); *G06Q 20/24* (2013.01); *G06Q 20/34* (2013.01)

(58) Field of Classification Search
None
See application file for complete search history.

(56) References Cited

U.S. PATENT DOCUMENTS

| | | | |
|---|---|---|---|
| 7,389,275 B2 * | 6/2008 | Kemper | ............... G06Q 20/382 705/64 |
| 8,260,677 B1 | 9/2012 | Leahy et al. | |
| 9,773,246 B2 | 9/2017 | Faith et al. | |
| 9,881,298 B2 | 1/2018 | Flitcroft et al. | |

(Continued)

*Primary Examiner* — Olabode Akintola
(74) *Attorney, Agent, or Firm* — DLA Piper LLP US

(57) ABSTRACT

A method for pre-authorizing a credit transaction may include receiving a pre-authorization request including a request identifier, a user identifier, a pre-authorization amount, a time duration identifier, and a vendor identifier, transmitting the pre-authorization request to a server remote from the user device, receiving a pre-authorization confirmation including the request identifier, a confirmation identifier, and a time duration identifier, and displaying a confirmation message that the pre-authorization request has been approved. A user device configured to pre-authorize a credit transaction may include a processor, a display in communication with the processor, a wireless transceiver in communication with the processor and a non-transitory memory storing instructions that, when executed by the processor, cause the processor to perform processing including receiving a pre-authorization request, transmitting the pre-authorization request to a server remote from the user device, receiving a pre-authorization confirmation, and displaying a confirmation message that the pre-authorization request has been approved.

20 Claims, 9 Drawing Sheets

(56) References Cited

U.S. PATENT DOCUMENTS

| | | | |
|---|---|---|---|
| 2015/0379514 A1* | 12/2015 | Poole | G06Q 20/227 |
| | | | 705/44 |
| 2017/0243410 A1 | 8/2017 | Caballero | |
| 2018/0046994 A1 | 2/2018 | Maenpaa et al. | |
| 2018/0262489 A1* | 9/2018 | Wadley | H04L 63/0861 |
| 2019/0073663 A1* | 3/2019 | Jamkhedkar | G06Q 20/3223 |

* cited by examiner

SYSTEMS AND METHODS FOR MOBILE PRE-AUTHORIZATION OF A CREDIT TRANSACTION

CROSS-REFERENCE TO RELATED APPLICATION INFORMATION

This is a continuation of U.S. patent application Ser. No. 16/184,542, filed Nov. 8, 2018, which is incorporated herein by reference in its entirety.

TECHNICAL FIELD

The present disclosure relates generally to methods and systems for providing pre-authorized transactions for credit-based purchase of goods or services.

BACKGROUND

When a user attempts to perform a transaction using a credit card, the transaction may be approved or denied by the credit card issuer. In some instances, for example a user traveling abroad, when a user attempts to perform a transaction with a foreign merchant, the credit card issuer may reject the transaction outright, for example if the credit account associated with the credit card is not authorized for transactions in a foreign country. Attempts at such credit transactions may be rejected for other reasons as well. For example, if a user does not have sufficient funds in a checking or savings account linked with the credit account, the credit issuer may reject the transaction request; if the user has a poor credit score and the user attempts a transaction for an amount exceeding a transaction limit associated with the account, the credit card issuer may reject the transaction; or if the user attempts a transaction with a new merchant, the credit card issuer may reject the transaction and then block or lock the card for subsequent transactions.

In order to try and ensure that a credit transaction is authorized, the user may call a dedicated customer phone number and request that any blocks (e.g., restrictions on a user's credit account) associated with a user's credit account be removed and other information recorded so that the credit card issuer does not reject the transaction when the user attempts the transaction. If a user is abroad, particularly in a location that does not speak a language native to the user, or if the user is in a rural area of a country with limited access for making a phone call, attempting to figure out contact information for enabling pre-authorization may be difficult and time-consuming. In some circumstances, the user may simply give up attempting such a pre-authorization, or by the time pre-authorization is approved, the user may have given up attempting the transaction. Further, if a user is the victim of fraud or theft, for example if the user's wallet containing the credit card and smartphone are stolen, a third party may attempt to fraudulently use the credit card to complete transactions that may negatively impact the credit of the user.

In addition, some users may be surprised or embarrassed when an attempt to perform a credit transaction at a merchant location is denied or rejected by a company that issued the credit card. Some users may use a credit card in a high-risk area, resulting in more frequent occurrences of risky transactions that can result in fraud (e.g., using a credit card at an unsecure terminal). Such high-risk users are unnecessarily exposing account information to a merchant in order to complete a transaction that may be denied (and will be denied if pre-authorization is required). In such situations, a high-risk user may not know ahead-of-time whether the transaction will be approved or denied, and may either attempt the transaction and receive an authorization denial notice, or may not even attempt the transaction.

SUMMARY OF THE DISCLOSURE

Systems and methods described herein may provide for pre-authorized transactions (either digital or real world) for the purchase of goods or services.

For example, a method for pre-authorizing a credit transaction may include receiving, by a processor, a pre-authorization request, transmitting, by a user device, the pre-authorization request to a server remote from the user device, receiving, from the server, a pre-authorization confirmation, and displaying, on a screen of the user device, a confirmation message that the pre-authorization request has been approved.

In some embodiments, the method may include displaying, on the screen of the user device, a pre-authorization option including at least a pre-authorization amount and a vendor name relating to a vendor identifier.

In some embodiments, the method may include receiving, by a processor, an additional pre-authorization request, transmitting, by the user device, the additional pre-authorization request to the server, receiving, from the server, an additional pre-authorization confirmation, and displaying, on the screen of the user device, an additional confirmation message that the additional pre-authorization request has been denied.

In some embodiments, the method may include receiving, by a processor, an additional pre-authorization request, transmitting, by the user device, the additional pre-authorization request to the server, receiving, from the server, an additional pre-authorization confirmation, and displaying, on the screen of the user device, an additional confirmation message that the additional pre-authorization request has been approved.

In some embodiments, the method may include displaying, on the screen of the user device, a first pre-authorization option, and displaying, on the screen of the user device, a second pre-authorization option.

In some embodiments, the method may include receiving, by the processor, an additional pre-authorization request.

As another example, a user device configured to pre-authorize a credit transaction may include a processor, a display in communication with the processor, a wireless transceiver in communication with the processor, and a non-transitory memory storing instructions that, when executed by the processor, cause the processor to perform processing including receiving a pre-authorization request, transmitting the pre-authorization request to a server remote from the user device, receiving a pre-authorization confirmation, and displaying a confirmation message that the pre-authorization request has been approved.

In some embodiments, the processing may further include displaying a pre-authorization option including at least a pre-authorization amount and a vendor name relating to a vendor identifier.

In some embodiments, the processing may further include receiving an additional pre-authorization request including an additional request identifier, a user identifier, an additional pre-authorization amount, and an additional vendor identifier, transmitting the additional pre-authorization request, receiving an additional pre-authorization confirmation including at least the additional request identifier and an additional confirmation identifier, and displaying an additional confirmation message that the additional pre-authorization request has been denied.

In some embodiments, the processing may further include receiving an additional pre-authorization request including an additional request identifier, a user identifier, an additional pre-authorization amount, and an additional vendor identifier, transmitting the additional pre-authorization request, receiving an additional pre-authorization confirmation, the additional pre-authorization confirmation including at least the additional request identifier and an additional confirmation identifier, and displaying an additional confirmation message that the additional pre-authorization request has been approved.

In some embodiments, the processing may further include displaying a first pre-authorization option including at least the pre-authorization amount and the vendor name relating to the vendor identifier, and displaying a second pre-authorization option including at least an additional pre-authorization amount and an additional vendor name relating to an additional vendor identifier.

In some embodiments, the processing may further include receiving an additional pre-authorization request including an additional request identifier, a user identifier, a pre-authorization amount, and a vendor identifier.

As another example, a method for pre-authorizing a credit transaction may include receiving, by a pre-authorization server, a pre-authorization request including a request identifier, a user identifier, a pre-authorization amount, and a transaction duration identifier, sending, by the pre-authorization server, a user information request to a database, receiving, by the pre-authorization server, user information including the user identifier, an account identifier, an account amount, and a user credit score, analyzing, by the pre-authorization server, the user information, creating, by the pre-authorization server, a pre-authorization response including the request identifier, the user identifier, an authorized amount, a time duration identifier, and the transaction duration identifier, and transmitting, by the pre-authorization server, the pre-authorization response to a user device.

In some embodiments, the method may further include transmitting, by the pre-authorization server, a time expiration message to the user device.

In some embodiments, the method may further include storing, by the pre-authorization server, the request identifier.

In some embodiments, the method may further include receiving, by a pre-authorization server, an additional pre-authorization request including an additional request identifier, the user identifier, an additional pre-authorization amount, and an additional transaction duration identifier, sending, by the pre-authorization server, an additional user information request to the database, receiving, by the pre-authorization server, additional user information including the user identifier, the account identifier, an additional account amount, and an additional user credit score, receiving, by the pre-authorization server, the stored request identifier, analyzing, by the pre-authorization server, the additional user information and the stored request identifier, creating, by the pre-authorization server, an additional pre-authorization response including at least the additional request identifier and the user identifier, and transmitting, by the pre-authorization server, the additional pre-authorization response to the user device.

In some embodiments, the method may further include transmitting, by the pre-authorization server, a pre-authorization option message to the user device.

In some embodiments, the method may further include receiving, by the pre-authorization server, a transaction message including the user identifier and a transaction amount, comparing the transaction amount to the pre-authorization amount, and transmitting, by the pre-authorization server, a pre-authorization revocation message to the user device.

DETAILED DESCRIPTION OF SEVERAL EMBODIMENTS

Figure 1:
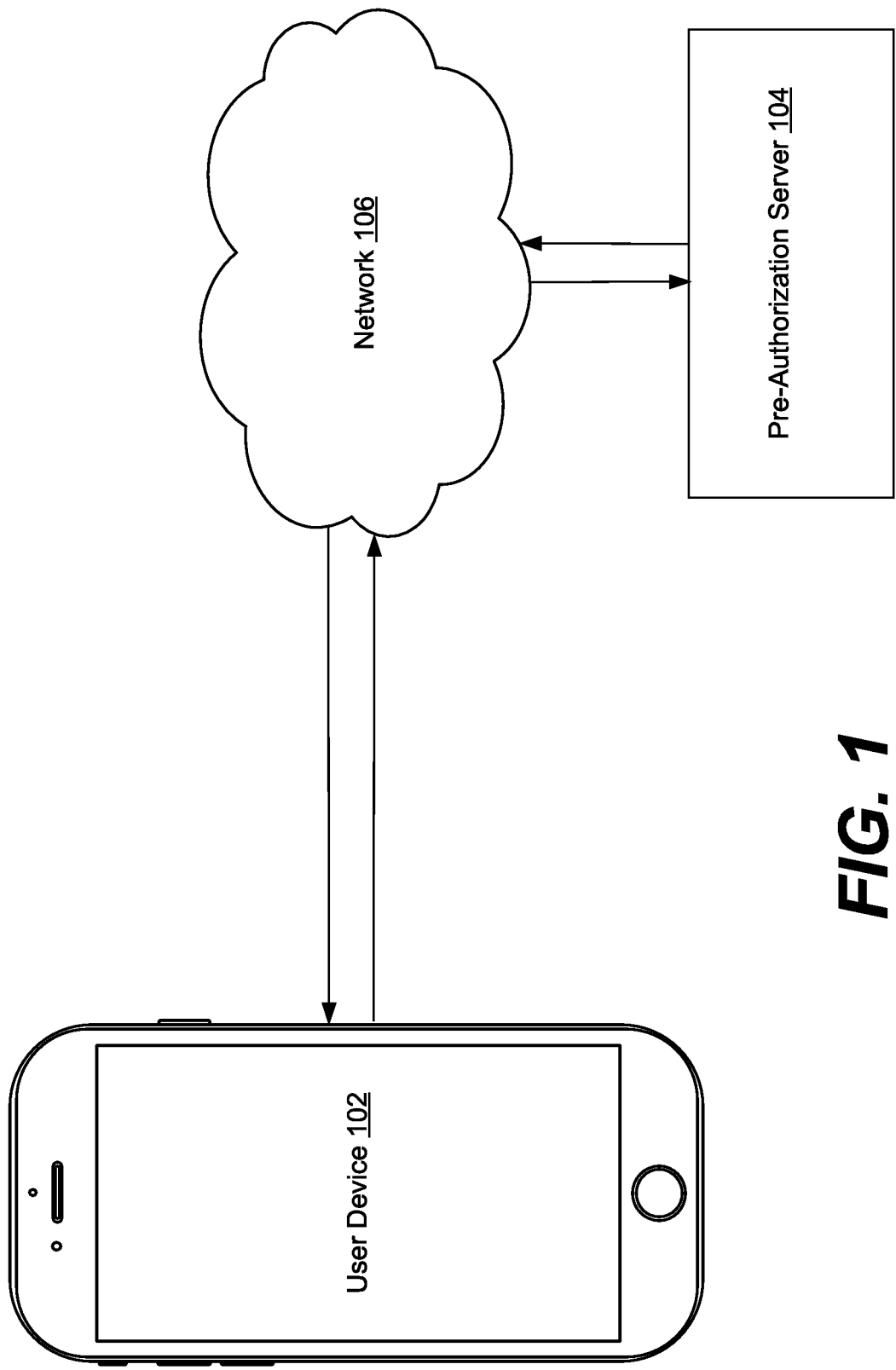
FIG. 1 shows a system with a user device and a pre-authorization server according to an embodiment of the present disclosure.

Reference will now be made in detail to exemplary embodiments of the present disclosure, examples of which are illustrated in the accompanying drawings and described herein. In the drawings, like reference numerals are sometimes used to designate like structural elements. It should also be appreciated that the depictions in the figures are diagrammatic and not to scale.

The present disclosure generally relates to systems and methods for pre-authorizing a credit transaction. The disclosed systems may include a user device, for example a smartphone or other device capable of communicating with another device, either locally or over a network, and a pre-authorization server, where the user device and the pre-authorization server are in communication. The user device may include an application (app) that provides a user interface for user interactions, such that a user may select one or more options for requesting a pre-authorized transaction. If a user selects one or more options and selects a pre-authorization button, the user device may transmit a pre-authorization request including information relating to the options selected by the user, for example an amount, a time duration, and a vendor identifier, as well as other information.

Such pre-authorization may be required for any transaction attempted by a high-risk user. A high-risk user may be an individual who frequently overdraws an account, completes transactions in high-risk areas (including areas commonly associated with fraud), or attempts to complete a transaction in a foreign country. The present disclosure also provides for intermitted policies requiring pre-authorization (rather than requiring pre-authorization for all transactions as described above). An example is if the user travels to a foreign jurisdiction with high fraud risk. Upon entering the foreign jurisdiction, an app may provide a notice to the user that transactions in that jurisdiction require pre-authorization. If the user then attempts a transaction using a credit card, the transaction is denied until if or when the user requests, and is granted, pre-authorization for the transaction. If the user returns to their home jurisdiction, the user may continue to use their credit card in a manner similar to before the user left for the foreign jurisdiction.

While some use cases may require a user to pre-authorize all transactions (e.g., a blanket pre-authorization policy), and some use cases may apply temporary or intermittent pre-authorization policies, for example if a user travels to a foreign jurisdiction associated with high fraud risk, other use cases are contemplated and described in the present disclosure. For example, individuals who are concerned about fraudulent use of a credit card may change settings or preferences associated with the credit card, such that pre-authorization is required for all transactions, or alternatively pre-authorization is required for certain types of transactions (e.g., for transactions between 12:01 pm and 5:59 am, for transactions with certain vendors, or for transactions above a certain value). Thus, the present disclosure is intended to cover different use case, and is not intended to be exhaustive of all potential use cases involving pre-authorization of a credit transaction.

The pre-authorization server may receive the pre-authorization request. Upon receipt of the request, the pre-authorization server may request and receive information relating to the user associated with the request, for example a credit score, a balance for a checking or savings account, excessive withdrawal history, and other user-specific information. The pre-authorization server may use this information to determine whether the pre-authorization request should be approved or denied. If approved, the pre-authorization server may transmit a notice to the user device that the pre-authorization request has been approved. The notice may include an amount approved, a time duration approved, and other information. The pre-authorization server may also communicate with a transaction server that receives transaction information relating to use of a credit card associated with a credit account assigned to the user. If the user performs an action, for example an attempt to transfer funds or withdraw funds from a checking account, the pre-authorization server may revoke the pre-authorization, and transmit a notice to the user device that the pre-authorization request has been revoked. In some embodiments, if the user fails to perform the transaction within a period of time, the pre-authorization server may automatically revoke the pre-authorization request, and may accordingly transmit a notice to the user device.

As described above, in some embodiments high-risk users may always be required to pre-authorize a transaction. For example, a user who frequently overdraws an account or completes transactions in high-risk neighborhoods that are associated with high occurrences of fraud may be required to pre-authorize a transaction. As a preliminary matter, if a high-risk user knows beforehand that a transaction with a merchant will be denied, then the user may not attempt the transaction until pre-authorization is granted. Such grant may occur, for example, through an app as disclosed in the present disclosure. In this manner, the user may not unnecessarily expose account information to the merchant in attempting a transaction that is denied. The user may instead pre-authorize the transaction and attempt the transaction, knowing that the issuer has pre-authorized the transaction (if successfully pre-approved), and the user can be confident that the transaction will be approved, subject to limits imposed by the issuer or self-imposed by the user as described in the present disclosure.

If pre-authorization is required for all transactions for a user, the user can rebuild a poor credit rating over time. For example, a user can establish a history of requesting pre-authorization and completing transactions where pre-authorization has been approved. If a user's credit account is compromised and a third party attempts to fraudulently use the card, because pre-authorization is required, the transaction will be rejected. In such a scenario, if the user has a history of requesting pre-authorization, the attempted transaction may be recognized as an attempted fraudulent transaction, and the user's credit will not be negatively impacted. In this manner, a user may be protected from credit card fraud.

FIG. 1 is a block diagram of an exemplary system including a user device 102, a pre-authorization server 104, and a network 106, for example the Internet, according to an embodiment of the present disclosure. Other configurations are possible. For example, in some embodiments, one or more user devices may be in communication with pre-authorization server 104, including user device 102, and in some embodiments, pre-authorization server 104 may include one or more servers for handling pre-authorization requests from one or more user devices, including user device 102.

User device 102 may be a smartphone, tablet, computer (desktop or laptop), or other user device configured to display information on a screen. User device 102 may send user data to pre-authorization server 104 through a network, for example network 106.

Network 106 may include one or more networks, such as the Internet or PSTN, and may include local networks and wide area networks (or WANs).

Pre-authorization server 104 may be a server configured to handle requests from a user device, such as user device 102, for pre-authorizing a credit transaction. Pre-authorization server 104 may access one or more services, including a credit score service, a user profile service (accessible through a database for example), and other services storing information that may be used in determining whether a request for pre-authorizing a credit transaction may be approved.

In some embodiments, pre-authorization server 104 may have access to a storage device that stores user information, for example a user profile that may include a credit score, account balance information, other user information (e.g., past transactions, transaction locations, and phone locations), and other related information (e.g., high-risk vendors and locations associated with higher fraud rates), that may be used in determining whether a pre-authorization request should be approved or denied. In such embodiments, storing user information in a storage device that is readily accessible by pre-authorization server 104 may improve the responsiveness of the server in responding to a pre-authorization request. The pre-authorization server 104 may periodically transmit a request to one or more servers that store current credit score, account balance, and other user information, so that the user information stored on a local storage device may be updated to include current information.

In some embodiments, pre-authorization server 104 may transmit a request, for example through an application programming interface (API) or through another method of requesting information from a device, for user profile information, credit score information, account balance information, and other information that may be used to determine whether a pre-authorization request should be approved. Such information may be accessible through one or more servers, for example a credit score server, an account server, and a user profile server, and in some embodiments one server may provide access to such information. Further, pre-authorization server 104 may transmit a request to a fraud detection server (not shown). Fraud detection server may include logic for flagging or blocking transactions from occurring for a user account. Pre-authorization server 104 may receive information from the fraud detection server indicating that a user's credit account has been flagged and/or blocked, and may use such information in determining whether to approve or reject a pre-authorization request.

As describes above, a user who has been issued a credit card can be associated with different pre-authorization policies. For example, for high-risk users, a blanket pre-authorization policy may be required (i.e., all transactions must be pre-approved). For other cases, a temporary or intermittent pre-authorization policy may be required (e.g., if the user travels to a foreign jurisdiction with high fraud risks, the user may be required to pre-authorize all transactions attempted in that jurisdiction). In still other cases, a user may, at the user's discretion, require pre-authorization for all transactions, or require pre-authorization for certain types of transactions. For each use case, the pre-authorization server 104 may access for example a user profile or other information associated with a user profile to determine whether a blanket pre-authorization policy applies to the user or whether the user has, at the user's discretion, has saved a custom pre-authorization policy. The pre-authorization server 104 can use such information in making a determination as to whether pre-authorization is required, and the types of situations in which pre-authorization is required for a user.

Figure 2:
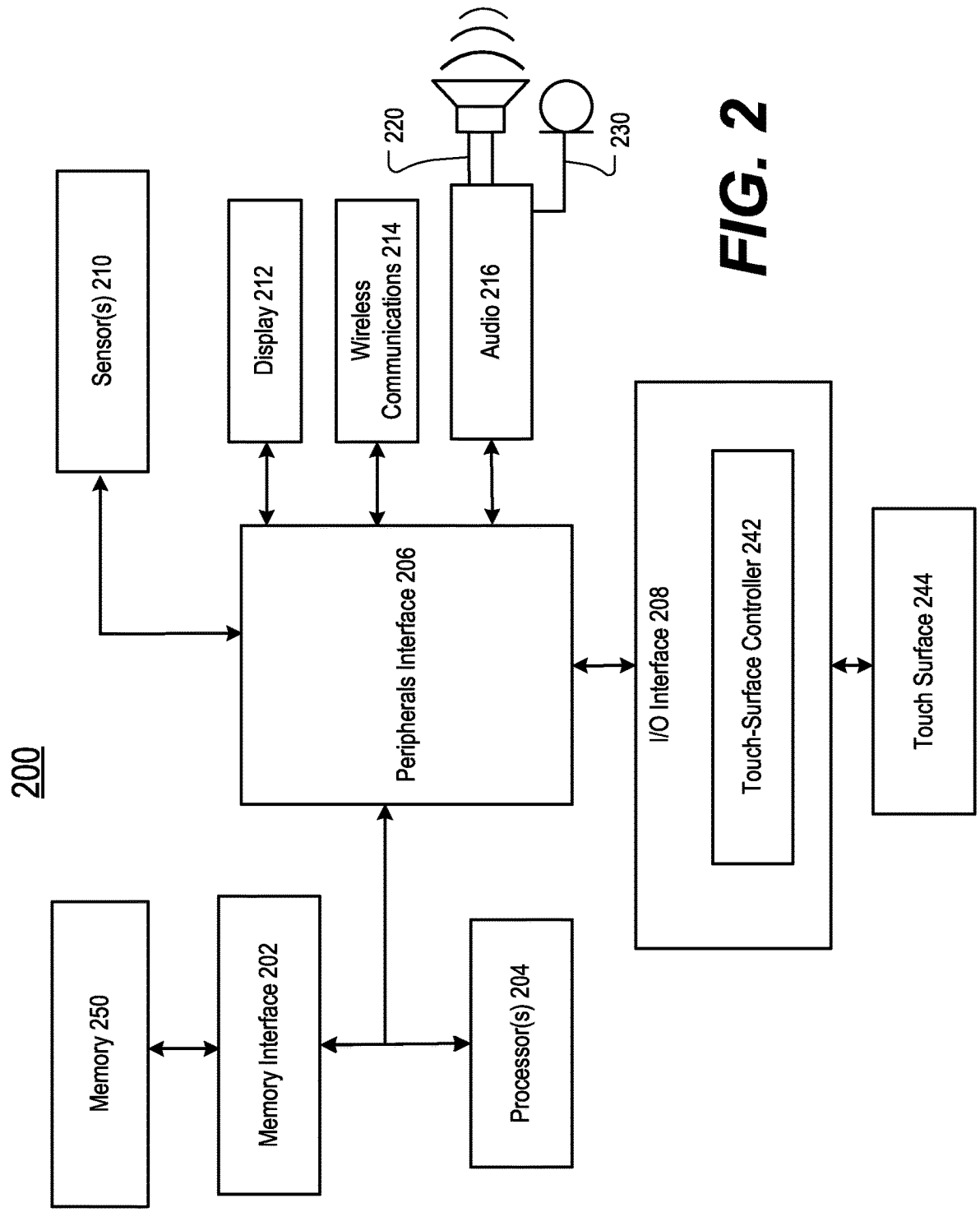
FIG. 2 shows a block diagram of a user device according to an embodiment of the present disclosure.

FIG. 2 shows a block diagram of an exemplary computing device 200, for example a computing device configured to function as user device 102. The computing device 200 may interact with a server, for example pre-authorization server 104, to transmit a pre-authorization request and to receive responses to such requests. The computing device 200 may include a memory interface 202, one or more data processors, image processors, graphics processors, and/or central processing units (CPU) 204, a peripherals interface 206, and an I/O interface 208. The memory interface 202, the one or more processors 204, the peripherals interface 206, and the I/O interface may be separate components or may be integrated in one or more integrated circuits. The various components in the computing device 200 may be coupled by one or more communication buses or signal lines.

One or more sensors 210 may be coupled to the peripherals interface 206. For example, such sensors may include a motion sensor, a light sensor, and a proximity sensor, where each sensor may be coupled to the peripherals interface 206 to facilitate orientation, lighting, proximity, and other functions. Other sensors may be added and connected to peripherals interface 206. For example, a camera system having an optical sensor, for example a charged coupled device (CCD) or a complementary metal-oxide semiconductor (CMOS) optical sensor, may be included in computing device 200. The camera system may be utilized for camera functions, such as recording photos and video. The camera system and the optical sensor may be used to collect images of a user to be used during authentication of a user, e.g., by performing facial recognition analysis.

Communications may be facilitated through wireless communication 214, which may include radio frequency (RF) and/or optical receivers, transmitters, and/or transceivers. For example, wireless communications 214 may include transceivers compatible with Bluetooth and Wi-Fi for communicating with other devices using such protocols.

The specific design and implementation of wireless communications 214 may depend on the communication network(s) over which the operating device 200 is intended to operate. For example, wireless communications 214 may include components designed to operate over a GSM network, a GPRS network, an EDGE network, a Wi-Fi or WiMAX network, and a Bluetooth network. For example, wireless communication 214 may include protocols, such that the computing device 200 may be configured as a base station for other wireless devices, for example to server as a Bluetooth master device, or as a Wi-Fi hosting device. In other embodiments, wireless communications 214 may also include components for handling wired communications. In such embodiments, a wired connection, for example an Ethernet connection, may be established to communicate with remote devices. Other wired and wireless communications are possible, and may depend on the type of device. For example, a smartphone may rely on wireless communications, whereas a desktop computer may rely on wired communications.

An audio system 216 may be coupled to a speaker 220 and a microphone 230 to facilitate voice-enabled functions, such as speaker recognition, voice replication, digital recording, and telephony functions. The audio system 216 may be configured to facilitate processing voice commands, voice printing, and voice authentication, for example.

The I/O interface 208 may include a touch-surface controller 242. The touch-surface controller 242 may be coupled to a touch surface 244. The touch surface 244 and touch-surface controller 242 may, for example, detect a contact and direction and force of a contact using any of a plurality of touch sensitivity technologies, including but not limited to capacitive, resistive, infrared, and surface acoustic wave technologies, as well as other proximity sensor arrays or other elements for determining one or more points of contact with the touch surface 244. In some embodiments, I/O interface may include other controllers, for example controllers configured to support input/control devices, such as one or more buttons, rocker switches, mouse wheel, infrared port, USB port, and/or a pointer device such as a stylus. The one or more buttons (not shown) may include a button for volume control of the speaker 220 and/or the microphone 230.

The memory interface 202 may be coupled to memory 250. The memory 250 may include high-speed random access memory and/or non-volatile memory, such as one or more magnetic disk storage devices, one or more optical storage devices, and/or flash memory (e.g., NAND, NOR). The memory 250 may store an operating system, such as Linux, UNIX, or other traditional and mobile operating systems. For example, the operating system may be a mobile operating system, such as Android or iOS, when computing device 200 is a mobile phone, tablet, or other device running operating system software designed for mobile applications. The operating system may include instructions for handling basic system services and for performing hardware dependent tasks. In some implementations, the operating system may be a kernel (e.g., UNIX kernel). In some implementations, the operating system may include instructions for performing voice authentication.

Figure 3:
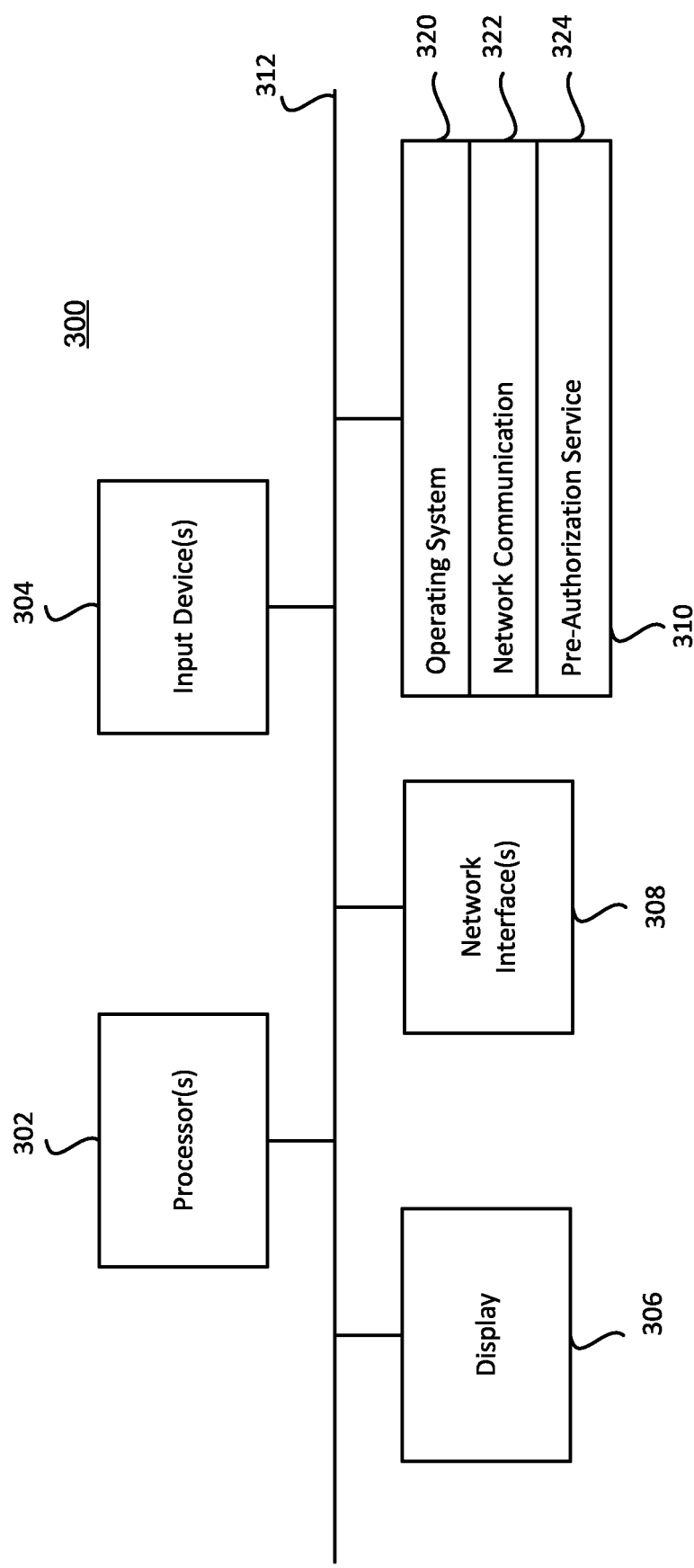
FIG. 3 shows a block diagram of a pre-authorization server according to an embodiment of the present disclosure.

FIG. 3 is a block diagram of an example server device 300, for example pre-authorization server 104, that may implement various functionality described in the present disclosure. The server device 300 may be implemented on any electronic device that runs software applications derived from compiled instructions, including without limitation personal computers, servers, smartphones, media players, electronic tablets, game consoles, email devices, etc. In some implementations, the server device 300 may include one or more processors 302, one or more input devices 304, one or more display devices 306, one or more network interfaces 308, and one or more computer-readable mediums 310. Each of these components may be coupled by bus 312.

Display device 306 may be any known display technology, including but not limited to display devices using Liquid Crystal Display (LCD) or Light Emitting Diode (LED) technology. Processor(s) 302 may use any known processor technology, including but not limited to graphics processors and multi-core processors. Input device 304 may be any known input device technology, including but not limited to a keyboard (including a virtual keyboard), mouse, and touch-sensitive pad or display. Bus 312 may be any known internal or external bus technology used for exchanging communications, for example ISA, EISA, PCI, PCI Express, NuBus, USB, Serial ATA and FireWire. Computer-readable medium 310 may be any medium that participates in providing instructions to processor(s) 302 for execution, including without limitation non-volatile storage media, such as optical disks, magnetic disks, flash drives, or volatile media, such as SDRAM.

Computer-readable medium 310 may include various instructions for implementing an operating system (e.g., macOS, Windows, or Linux). Exemplary instructions are described in more detail in the present disclosure.

The operating system 320 may include perform basic tasks, including but not limited to recognizing input from input device 304, sending output to display device 306, keeping track of files and directories on computer-readable medium 310, controlling peripheral devices (e.g., disk drives, printers, etc.), which may be controlled directly or through an I/O controller, and managing traffic on bus 312.

Network communications 322 may establish and maintain network connections (e.g., software for implementing communication protocols, such as TCP/IP, HTTP, Ethernet, telephony, etc.). In some embodiments, the network interface(s) may include instructions for creating and maintaining network connections.

Pre-authorization service 324 may include instructions that evaluate pre-authorization requests received from a user device. For example, pre-authorization service 324 may analyze a user's pre-authorization request, including analyzing information included with the request, such as an amount, a time duration, and a vendor identifier. For example, if the pre-authorization receives a pre-authorization request for a minor amount (e.g., $5) and for a vendor identifier that the user has previously transacted with (e.g., a coffee shop), the pre-authorization service 324 may approve the transaction without further significant analysis. In some embodiments, for example if the pre-authorization request includes a request for a significant amount of funds (e.g., $500) and for a vendor identifier where no prior transaction history exists, the pre-authorization service may request additional information and perform additional analysis to determine whether the pre-authorization request should be approved.

The described features may be implemented in one or more computer programs that may be executable on a programmable system including at least one programmable processor coupled to receive and transmit data to a data storage system, at least one input device, and at least one output device. A computer program is a set of instructions that can be used, directly or indirectly, in a computer to perform a certain activity or bring about a certain result. A computer program may be written in any form of programming language, for example Objective-C, Java, Swift, and C++, as well as other programing languages, and it may be deployed in any form, including as a stand-alone program or as a module, component, subroutine, or other unit suitable for use in a computing environment.

Server device 300 may include general and special purpose microprocessors, and may include a single processor, multiple processors, or one or more cores. A processor may receive instructions and data from a read-only memory or a random access memory. Generally, a computer may include, or be operatively coupled to communicate with, one or more mass storage devices for storing data files. Such devices may include magnetic disks, such as internal hard disks and removable disks, magneto-optical disks, and optical disks. Storage devices suitable for tangibly embodying computer program instructions and data may include all forms of non-volatile memory, including by way of example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, ASICs (application-specific integrated circuits).

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, POTS, LAN, WAN, and the Internet. The computer system may include clients and servers that may be local or remote from each other.

One or more features of the present disclosure may be implemented using an API. An API may define one or more parameters that are passed between a calling application and other software code (e.g., an operating system, library routine, function) that provides a service or data, or that performs an operation or a computation. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API. In some implementations, an API call may report to an application the capabilities of a device running the application, such as input capability, output capability, processing capability, power capability, communications capability, etc.

Figure 4:
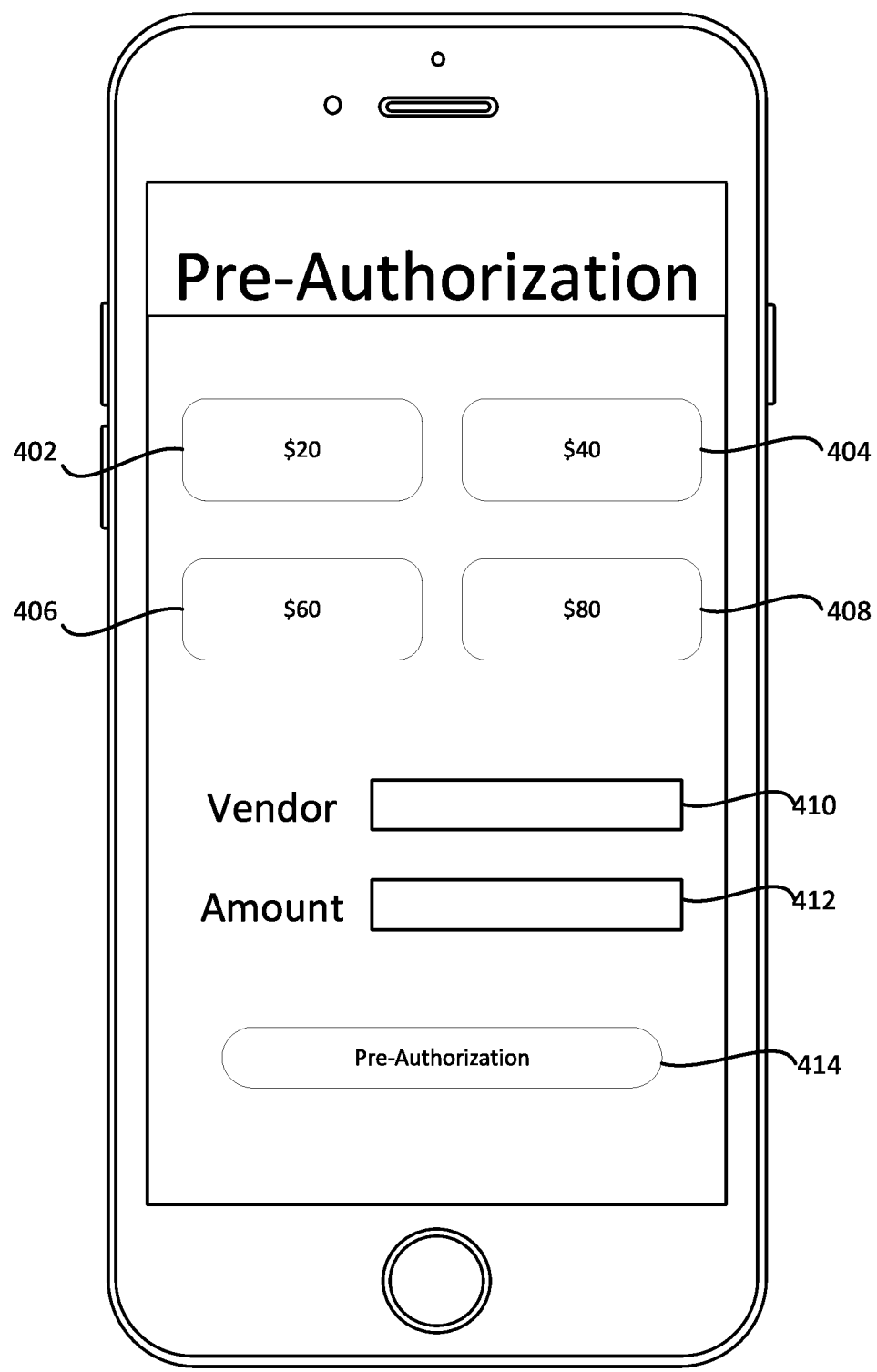
FIG. 4 shows a user interface of a pre-authorization application according to an embodiment of the present disclosure.

FIG. 4 shows a user device (e.g., user device 102), configured for example in a manner consistent with computing device 200, that includes a pre-authorization application (app) that is configured to run on user device 102. In some embodiments, the pre-authorization app provides other services besides pre-authorizing a transaction. For example, the app may include banking features, such as viewing account information and transferring funds between accounts. In other embodiments, the app may provide a service focused on pre-authorization.

As shown in FIG. 4, there are four (4) softkeys, or buttons, button 402, button 404, button 406, and button 408. There is also a vendor identifier 410, an amount identifier 412, and a pre-authorization selection button 414. Each of buttons 402, 404, 406, and 408 indicate an amount that a user may select for pre-authorizing a transaction, for example $20, $40, $60, and $80. Other amounts may be used. For example, smaller increments (e.g., increments of $5, starting with $5) could be used, or larger increments could be used (e.g., increments of $50, starting with $50).

In some embodiments, if the user selects any of buttons 402, 404, 406, and 408, a pre-authorization request indicating the amount desired may be transmitted to a pre-authorization server.

The vendor identifier 410 may be used to select a vendor for purposes of the pre-authorized transaction. In some embodiments, the vendor identifier 410 may be a drop-down list of vendors that the user has previously performed a transaction with, and in some embodiments the vendor identifier 410 is a text-editable field, such that the user may enter the name of the vendor. If the user enters a vendor name into vendor identifier 410, the app may include logic for providing a vendor recommendation or suggestion. For example, if the app has permission to use the user's location, and if the user begins to type in the phrase "Pete's Coffee," the app logic may identify a local business (e.g., Pete's Coffee) that is nearby the user, based on the location information provided by the user device 102. The app may then provide a suggestion to the user that identifies the name of the local business. The user may then enter an amount in text field 412, which indicates the amount that the user desires to request for a pre-authorized transaction.

Once sufficient information has been entered, for example a vendor identifier 410 has been selected and the amount identifier 412 has been provided, the user may select the pre-authorization button. If the user selects this button, then the user device 102 may transmit a request including the vendor identifier 410 and the amount identifier 412 to a remote device for pre-authorizing the transaction. In some embodiments, all fields may be required in order to transmit the pre-authorization request. In other embodiments, some fields may be required, and other fields may not be required. For example, the app may transmit a request if only an amount identifier 412 is provided, and no information is provided for vendor identifier 410.

Other configurations are possible. For example, if the user has a high-risk profile, the app may only display buttons 402, 404, 406, and 408, such that the user may not enter a customized vendor and amount in fields 410 and 412. In some embodiments, the user may only be able to view button 402, or a combination of buttons 402, 404, 406, and 408, for example if the user has a high-risk profile.

In some embodiments, the user may be required to login (not shown in FIG. 4). The user may be required for example to input a user name and password that can be customized by the user. The password may comprise alphanumeric text with special characters, and in some embodiments may be a 4 or 6 digit number (e.g., after a user has downloaded an app, created an account, and linked it with a credit card issued to the user).

Multi-factor authentication may also be provided by the app, either as a requirement to access user information, or as an additional security step requested by the user. For example, on an initial login after a lengthy period of time since a last login (e.g., the user logs in through the app after not using the app for more than a year), a user may be required to input a code previously sent to a device associated with the user, also referred to as two-factor authentication. Thus, a user's digital wallet can be protected from unauthorized access by a third party attempting to pre-authorize a transaction for fraudulent purposes, for example of such third party stole the user's smartphone and wallet. For a user with a poor credit history attempting to rebuild their credit, this feature may be useful in preventing marks against the user's credit, or in other words from the fraudulent activity being attributed to the user, either through suspected involvement in the fraud or through negligence.

Figure 5:
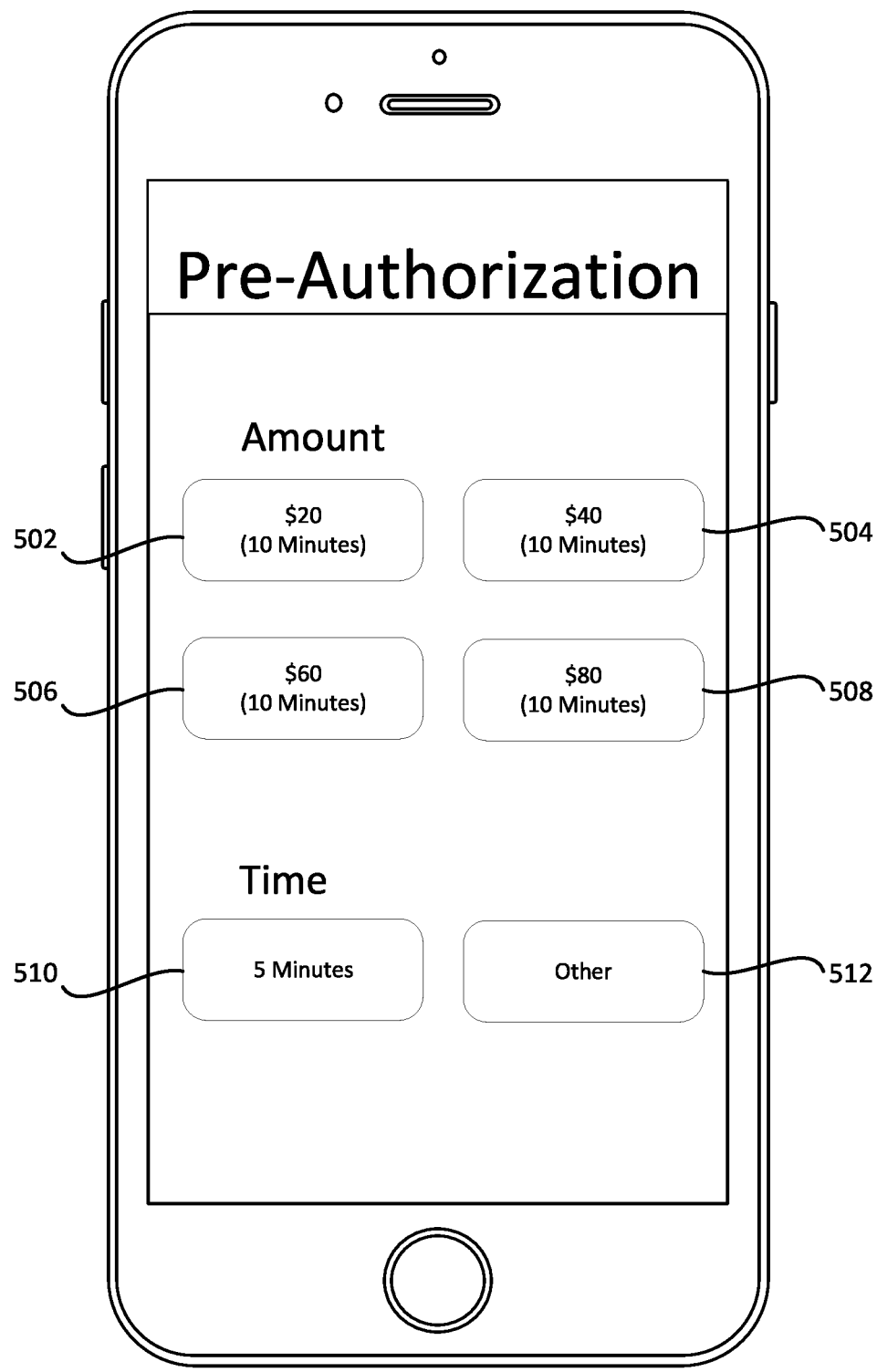
FIG. 5 shows another user interface of a pre-authorization application according to an embodiment of the present disclosure.

FIG. 5 shows a user device (e.g., user device 102), configured for example in a manner consistent with computing device 200, that includes a pre-authorization app that is configured to run on user device 102. In FIG. 5, there is a button 502, button 504, button 506, and button 508. Each of button 502, 504, 506, and 508 indicate an amount and a time. For example, button 502 indicates an amount of $20 and a time of 10 minutes. Button 510 and button 512 are additional buttons that a user may interact with on their user device 102. Button 510 indicates a time, for example a time duration for which a pre-authorized transaction may be approved for (i.e., the time period that the pre-authorized transaction may occur before the pre-authorization expires). Selecting button 510 may result in a one-click process, where a pre-authorization request for an undefined amount and for a period of five (5) minutes is requested. Button 512 indicates "Other," and allows a user to request a pre-authorized transaction for a custom amount and time duration. For example, if a user selects button 512, a pop-up window (not shown) may display that includes a text-editable field indicating an amount and a text-editable field indicating a time duration. The user can enter a custom amount and time duration, and then submit a pre-authorization request, for example by selecting a submit button. In some embodiments, in response to a user selecting button 512, a new user interface may display instead of a pop-up window.

Other configurations are possible. For example, instead of button 512, the user interface shown in FIG. 5 may include parts of the user interface shown in FIG. 4, for example a text-editable field indicating an amount and a text-editable field indicating a time duration, as well as a button indicating that a user can submit a customized pre-authorization request (similar for example to button 414). In some embodiments, instead of a text editable field (or scrollable selectable field) relating to a vendor, a text editable field may include a time duration indication, where a user may be able to enter a custom time duration in to the text editable field. Further, in some embodiments, if the user has a transaction history for a specific amount and time duration, the text editable field for the amount and the text editable field for the time duration may be pre-filled (e.g., those fields may be pre-populated with an amount and a time duration based on the user's transaction history).

In some embodiments, a user may select a single button for requesting a pre-authorization transaction for a defined time and amount (i.e., a one-click process). For example, if the user selects button 502, user device 102 may transmit a pre-authorization request to a remote server (e.g., pre-authorization server 104) that includes information relating to the context of the button selected. If the user selects button 502, the request includes an amount indicating $20 and a time duration indicating 10 minutes. If the pre-authorization request is approved, then the user may be able to complete a transaction with a limit of $20 and a time duration of 10 minutes. In such a manner, a user may request pre-authorization with minimal steps and without having to navigate through multiple user interfaces. If the user attempts a transaction for an amount greater than $20, then the transaction may be denied by one or more transaction servers. If a user waits more than 10 minutes to attempt a transaction, then the transaction may be denied by one or more transaction servers. Buttons 504, 506, and 508 may provide similar one-click functionality.

Button 510 may also provide one-click functionality. For example, a user may select button 510, where a pre-authorization request for a pre-authorized transaction may be sent to a pre-authorization server. The pre-authorized transaction request may include a time duration identifier (e.g., 5 minutes) and an unspecified amount identifier. If approved, the user may be pre-authorized to perform a transaction within approximately five (5) minutes of the approval for an open amount.

In other embodiments, button 510 may be used to adjust the time duration associated with buttons 502, 504, 506, and 508. For example, a user may select button 510 before selecting one of buttons 502, 504, 506, and 508. If the user selects button 510, then buttons 502, 504, 506, and 508 may be updated to indicate a time duration of 5 minutes (instead of 10 minutes).

In some embodiments, a user may also select button 512, labeled "Other." If the user selects button 512, then the user interface may change to present additional buttons (not shown), for example a button indicating a time duration of 20 minutes and a button indicating a time duration of 30 minutes. In some embodiments, the user interface may also present a text-editable field where a user can enter a custom time, for example 60 minutes. Any combination of buttons and text-editable fields may be provided to a user. A benefit of a selectable button is that a user may be able to more efficiently request a pre-authorized transaction, for example by performing a one-click process for requesting a pre-authorized transaction. Text-editable fields may be used to provide customized options to the user when requesting a pre-authorized transaction.

Figure 6:
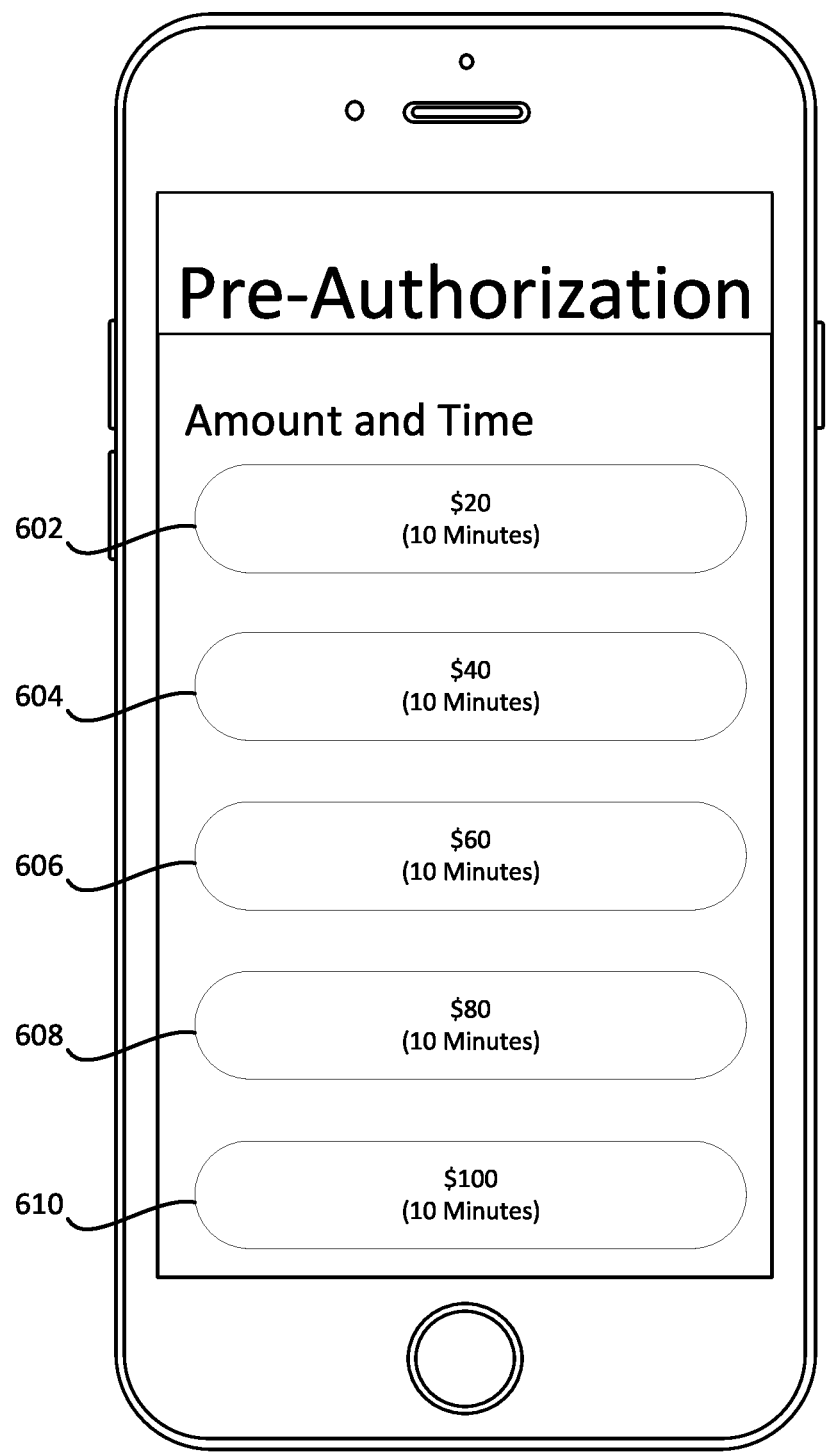
FIG. 6 shows another user interface of a pre-authorization application according to an embodiment of the present disclosure.

FIG. 6 shows a user device (e.g., user device 102) configured for example in a manner consistent with computing device 200, that includes a pre-authorization application (app) that is configured to run on user device 102. In FIG. 6, buttons 602, 604, 606, 608, and 610 are presented to the user. Each button indicates an amount and a time duration. For example, button 602 indicates an amount of $20 and a time duration of 10 minutes. In the embodiment shown in FIG. 6, each of buttons 602, 604, 606, 608, and 610 show a time duration of 10 minutes, but additional time durations may be provided. In some embodiments, each of button may indicate a vendor name, in addition to an amount and a time duration. For example, if the app logic detects that the user is located near or in a business, the app logic may update the buttons to display the vendor name information. In such embodiments, the user may be able to select an amount, a time duration, and a vendor name.

A user may customize the pre-authorization app that runs on for example a user device 102 that is configured in a manner consistent with computing device 200. For example, the pre-authorization app may store a user profile associated with the user of user device 102. The user profile may store various attributes relating to the user, for example a user name or handle, a user preferred pre-authorization time duration, a user preferred vendor name (or list of preferred vendor names), and a user preferred pre-authorization amount. In such embodiments, the app logic may configure buttons to display amount, vendor, and time duration information consistent with information stored in the user's profile.

Figure 7:
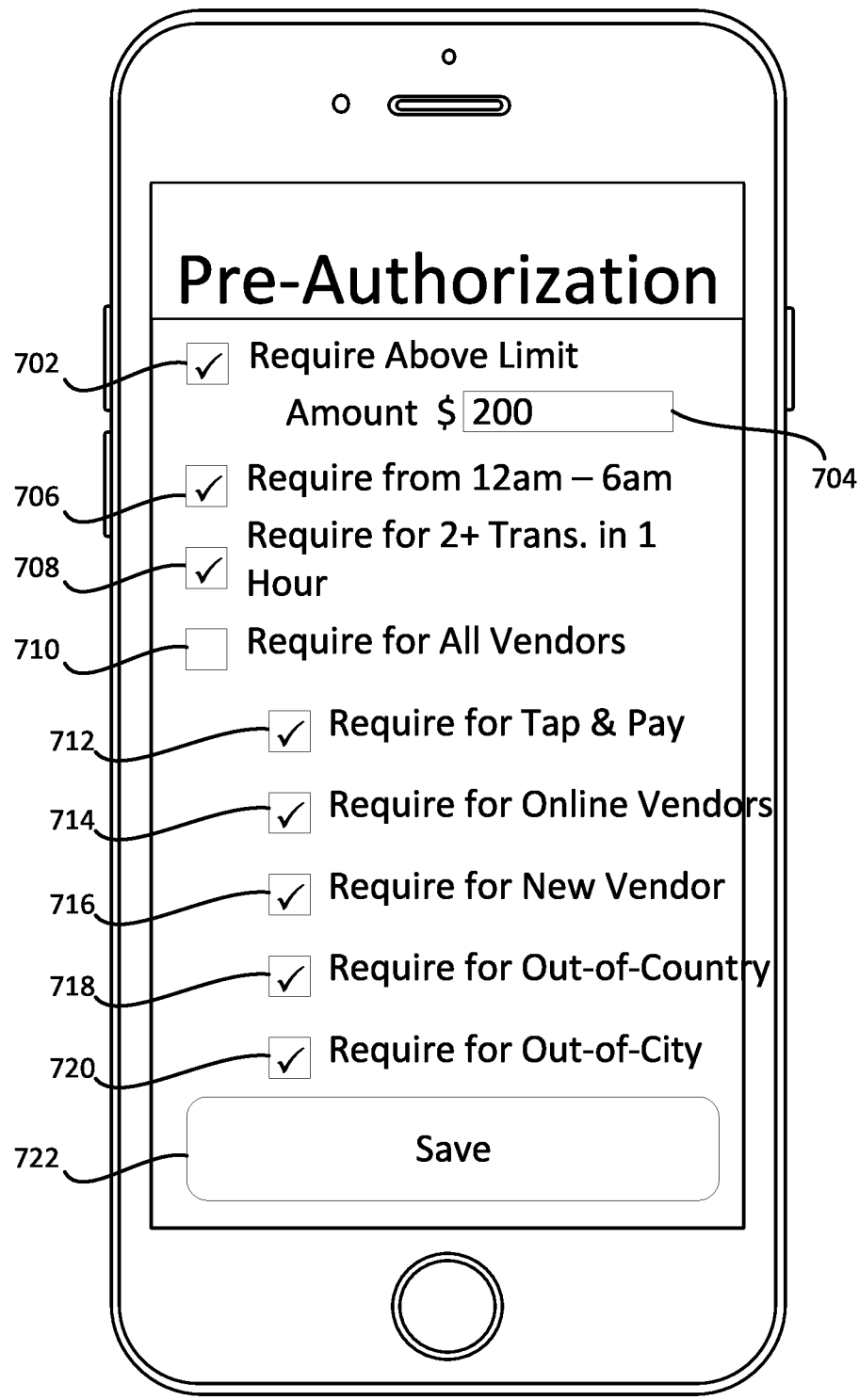
FIG. 7 shows a user interface for the user configuration of a pre-authorization application according to an embodiment of the present disclosure.

FIG. 7 shows a user device (e.g., user device 102), configured for example in a manner consistent with computing device 200, that includes a pre-authorization app that is configured to run on the user device. In the embodiment shown in FIG. 7, the user is presented with a user interface that presents user-configurable options. In FIG. 7, checkboxes 702, 706, 708, 710, 712, 714, 716, 718, and 720 are presented to the user, along with text field 704 and button 722. Each of checkboxes 702, 706, 708, 710, 712, 714, 716, 718, and 720 are user-selectable, and may result in the display of a text-editable field, button, or pop-up window. For example, if a user selects checkbox 702 (indicating a preference for requiring pre-authorization for a transaction above a threshold limit), text field 704 (indicating a threshold amount for a transaction before pre-authorization is required) may appear. In some embodiments, text field 704 may be a selectable field with various options, for example $50, $100, $200, or $500.

The user interface shown in FIG. 7 includes various user-configurable options. For example, checkbox 706 enables a user to require pre-authorization for transactions occurring between 12 a.m. and 6 a.m. (e.g., times when a user would typically be sleeping), checkbox 708 requires pre-authorization for more than two transactions occurring within a one-hour (or 60 minute) timespan, and checkbox 710 requires pre-authorization for all vendors, regardless of frequency that a user may visit a particular vendor (or the fraud history associated with a vendor).

Other embodiments are possible, for example the user may specify the time period associated with checkbox 706, and the user may specify the number of transactions allowed before pre-authorization is required (e.g., the user may allow 3 or more transactions before pre-authorization is required).

Checkboxes 712 through 720 provide different types of vendor-related pre-authorization requirements, if the user for example does not prefer to require pre-authorization for all vendors. Checkbox 712 requires pre-authorization for vendors offering a tap and pay service, checkbox 714 requires pre-authorization for online vendors, checkbox 716 requires pre-authorization for new vendors (e.g., the user has no transaction history with a vendor), checkbox 718 requires pre-authorization for transactions occurring outside of the user's home country, and checkbox 720 requires pre-authorization for transactions occurring outside of the user's home city. Button 722 may allow the user to modify a user profile (including changing any of the selections associated with checkboxes 702, 706, 708, 710, 712, 714, 716, 718, and 720, and text field 704) and save the changes. In some embodiments, the user device transmits a user profile request to the pre-authorization server or a server with access to a stored version of the user's profile, and such server updates the user's profile consistent with the requested changes.

In some embodiments, if a user has required pre-authorization above a certain amount, for example $200, if a transaction request for an amount greater than $200 is received by a server handling user transactions without a prior pre-authorization request being received by the pre-authorization server, the transaction request may be denied (as well as all other transactions exceeding $200). In a similar manner, if the user has selected the checkbox 706 requiring pre-authorization between 12 a.m. and 6 a.m., then if a transaction is attempted at, for example, 2 a.m. and the user has not pre-authorized the transaction, then the transaction may be denied (as well as all other transactions attempted during that time frame). If the user is in a high-risk environment (e.g., the user is located in a neighborhood with a high fraud incident rate), certain options shown in the user interface of FIG. 7 may be required, even if a checkbox is not selected. For example, if the user is in a high-risk environment, and has not previously selected checkbox 702 and provided an entry in text editable field 704, the app may still require pre-authorization for transactions over a certain amount. In some embodiments, the text editable field 704 may be non-editable, and may be pre-populated with an amount approved by the app or pre-authorization server.

The user interface shown in FIG. 7 may include additional user options, or may include fewer user options. In some embodiments, if a user account is associated with a higher risk profile (e.g., the user's credit score is low), the user may not be able to see options for pre-authorizing a transaction. For example, if a user has a high-risk profile, the credit card issuer may require pre-authorization for all transactions with an amount greater than, e.g., $200. If the user navigates to a user interface with user options, the option for requiring pre-authorization for a transaction above a dollar threshold (e.g., checkbox 702 and text field 704) may be hidden from the user's view. In some embodiments, the user's risk profile may change depending on the location of the user. For example, if the user is in a location associated with a high-risk profile (e.g., the location is in an area associated with credit card fraud), the pre-authorization app may hide user options from the display of the option screen. In that example, the option for requiring pre-authorization between 12 a.m. and 6 p.m. may be hidden from the user's view, such that the user cannot select checkbox 706 (and requiring pre-authorization for 12 a.m. through 6 p.m., regardless of whether the user desires to remove this restriction). Other options, for example checkboxes 712, 714, 716, 718, and 720 may be hidden from the user's view, or other options (not shown) may similarly be hidden from the user's view depending on factors, such as the user's location and the user's risk profile.

In some embodiments, the user interfaces shown in FIGS. 4-6 may vary, depending on user profile settings configured, for example, using a user interface such as that shown in FIG. 7. For example, if the user frequently requests pre-authorization in an amount for $100, then the app may add an additional soft key (or change the information associated with one or more soft keys) indicating an amount of $100. Such a change may be made to the exemplary user interface shown in FIG. 4, for example by changing button 408 to indicate "$100" instead of "$80."

Figure 8:
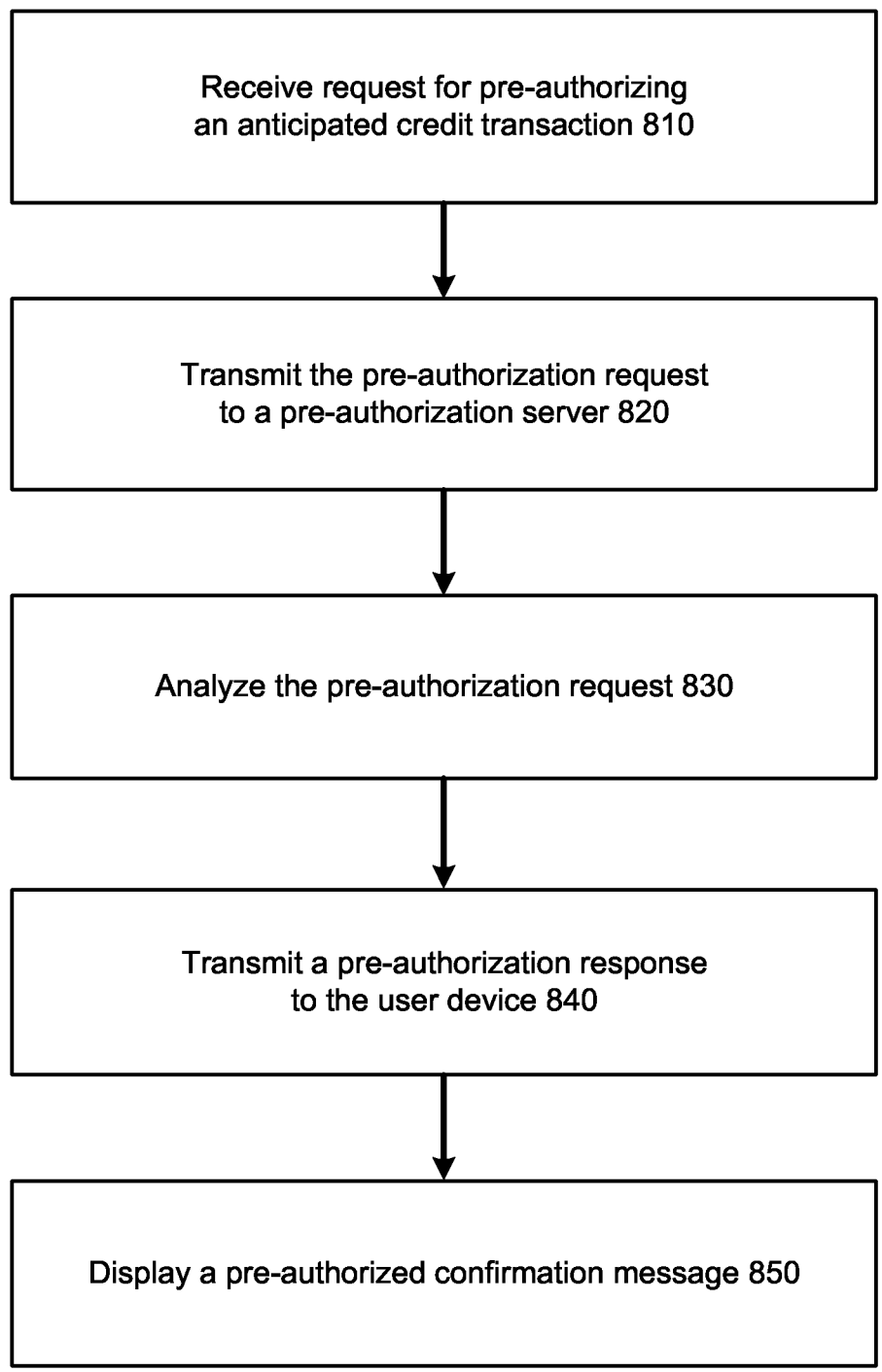
FIG. 8 shows a pre-authorization transaction method according to an embodiment of the present disclosure.

FIG. 8 shows a pre-authorization process according to an embodiment of the present disclosure. User device 102 may be configured to perform certain steps of the process shown in FIG. 8, and pre-authorization server 104 may perform other certain steps of the process shown in FIG. 8. As discussed in the present disclosure, a user may be required to pre-authorize all transactions (e.g., where a blanket pre-authorization policy has been applied). If a user attempts a credit transaction before requesting pre-authorization, for example before step 810 of FIG. 8, the credit transaction may be denied. If a user is aware that a blanket pre-authorization policy has been applied to the user, the user can, over time, build credit by consistently requesting and receiving pre-authorization, and then completing transactions. In this manner, the user can avoid overdraws of an account, or likewise if a third party attempts to fraudulently use the credit card, the user's history can be used to determine that the attempted transaction was attempted by a third party (not the user), and thus no impact to the user's account or credit history may be recorded. Further, if a user is aware of a blanket pre-authorization policy applied to the user, the user may not unnecessarily expose account information to merchants (and increasing the possibility of later fraudulent use of the user's account) until pre-authorization has been granted. In this manner, rather than submitting multiple transaction requests, with each request including user-specific account information, the user can pre-authorize a transaction and attempt the transaction a single time.

At step 810, a user device, for example user device 102, may receive a request for pre-authorizing a credit transaction, for example a transaction that the user of the requesting device anticipates making soon. The pre-authorization request may include an amount identifier, a vendor identifier, a time duration identifier, a user identifier, and other information, and may be received after a user interacts with a user interface, for example one or more of the user interfaces shown in FIG. 4, FIG. 5, and FIG. 6.

Some information may be required, for example a user identifier that may be used to identify the user making the pre-authorization request. Other information may be optional, for example the vendor identifier if the user prefers to request an amount and a time duration for a pre-authorized transaction. The pre-authorization request may also include additional information, for example a location identifier that indicates a location of the user, a timestamp identifier that indicates a time when the request was originally submitted, and other information. The pre-authorization request may include a unique identifier, such that a user device or a pre-authorization server may be able to identify a specific pre-authorization request.

At step 820, the user device transmits the pre-authorization request to a pre-authorization server (e.g., pre-authorization server 104). This step may be done in response to a user selecting a pre-authorization button, for example pre-authorization button 414 in FIG. 4 or pre-authorization button 514 in FIG. 5.

At step 830, the pre-authorization server may analyze the pre-authorization request. As discussed herein, the pre-authorization request may include different types of information, and the analysis performed by pre-authorization server may depend on the types of information provided with the pre-authorization request. In order to analyze the pre-authorization request, it may include a user identifier. The user identifier may be used for determining the user that is requesting the pre-authorization transaction. The pre-authorization server may use the user identifier to obtain information relating to the user. For example, the pre-authorization server may transmit a request to a service that has access to the user's account information. Such account information may include a checking account and/or a savings account.

Step 830 may also involve analyzing information not provided with the pre-authorization request. For example, in determining whether the pre-authorization request should be approved, the pre-authorization server may analyze past credit card transaction data, recent credit card transaction data, and credit profile information associated with a user profile or account, as well as other information relating to a user's credit account. The pre-authorization server may obtain and analyze past credit card transaction data, including transaction data from six months and beyond (or transactions dating back one or more years), and analyze the types of such transactions, the vendors associated with such transactions, and the amounts of such transactions. The pre-authorization server may also obtain and analyze recent credit card transaction data, including activity within the past six months. In such embodiments, the pre-authorization server may analyze various aspects of a transaction, for example the vendor, type, and amount of such transactions. Further, the pre-authorization server may analyze credit profile information associated with a user's account. For example, the pre-authorization server may request such information from a data source in communication with the pre-authorization server, or may request such information from a third party through an API. The credit profile information may include user's residences over a period of time, a credit score, a credit score history, and other information that the pre-authorization server may use in analyzing whether to approve the pre-authorization request.

At step 840, the pre-authorization server may transmit a pre-authorization response to the user device. The response may be sent in response to the pre-authorization request originally transmitted from the user device. In some embodiments, the pre-authorization response may include a request identifier, a confirmation identifier, and a time duration identifier.

The request identifier may represent a unique identifier of the request, such that the user device may be able to determine which request the pre-authorization response is related to. For example, in some embodiments, the user may submit multiple pre-authorization requests. In such embodiments, logic is needed for the app logic to identify relationships between a pre-authorization response and a pre-authorization request. In some embodiments, the user may only be able to transmit a single pre-authorization request, and the app logic may prevent the user from transmitting additional requests until the initial pre-authorization request is processed.

The confirmation identifier may indicate whether the pre-authorization request is approved or denied. The confirmation identifier may be used by the app logic to display a confirmation or denial message to the user through the app's user interface. In this manner, a user may understand whether a request has been approved or denied.

The time duration identifier may indicate the amount of time the pre-authorization request is approved for. In some embodiments, the time duration identifier may be the same as a time duration identifier included in the pre-authorization request. In other embodiments, for example in embodiments where a user does not select a time duration for a pre-authorization request, the pre-authorization server may determine the time duration that has been approved for the pre-authorization request, and may populate the time duration identifier in the response.

In some embodiments, the time duration identifier is optional. Further, in some embodiments, the pre-authorization response may include additional fields, for example an amount identifier, a location identifier, or other information.

At step 850, a pre-authorized confirmation message is displayed on the screen of a user device, for example user device 102. In some embodiments, if the pre-authorization server approves a pre-authorization request, app logic on the user device may be configured to display information included in the pre-authorization response, including an amount, vendor name, and time duration, and display a confirmation message such that the user may appreciate that the pre-authorized transaction has been approved and the user may proceed with performing the transaction.

In other embodiments, if the pre-authorization server denies a pre-authorization request, app logic on the user device may be configured to display information included in the pre-authorization response, for example a denial descriptor. The app logic may modify the user interface to notify the user that the pre-authorized request has been rejected, and display a reason for the rejection based on the denial descriptor. In some embodiments, the pre-authorized response may include a denial descriptor, and in other embodiments, no denial descriptor may be provided in the pre-authorized response.

Figure 9:
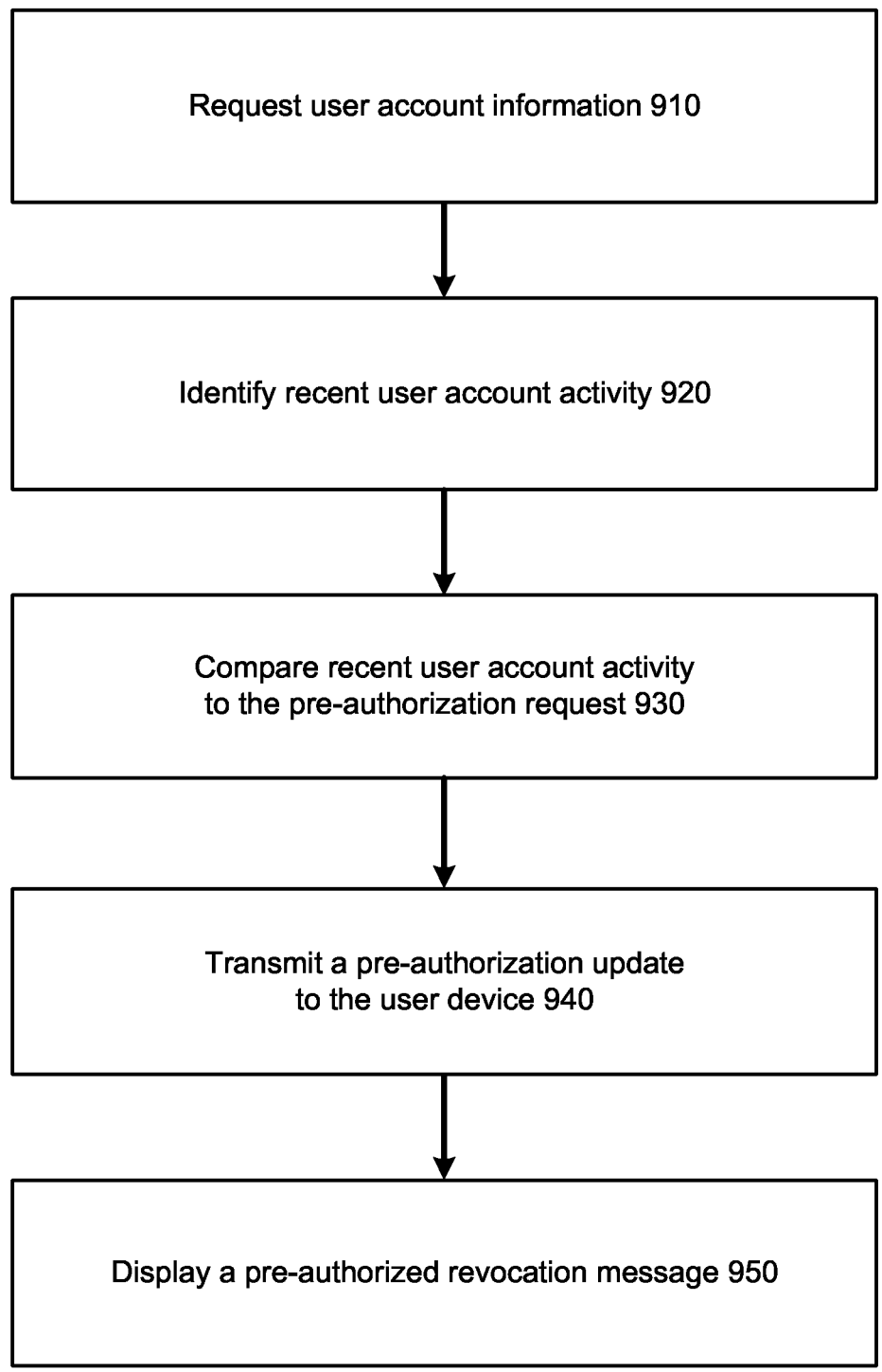
FIG. 9 shows a pre-authorization transaction revocation method according to an embodiment of the present disclosure.

FIG. 9 shows a pre-authorization revocation process according to an embodiment of the present disclosure. User device 102 may be configured to perform certain steps of the process shown in FIG. 8, and pre-authorization server 104 may perform other certain steps of the process shown in FIG. 8.

At step 910, user account information is requested. In some embodiments, pre-authorization server (e.g., pre-authorization server 104) transmits the request to a storage device, for example a database, where user account information is stored. In other embodiments, the pre-authorization server stores user account information locally when, for example, it receives the pre-authorization request.

At step 920, pre-authorization server identifies recent user account activity. In some embodiments, pre-authorization server 104 may identify such activity. The user activity may indicate credit activity, for example a user performing a transaction using the user's credit account. In some embodiments, the pre-authorization server may request automatic updates regarding user activity relating to a user's credit account. For example, if a user performs a transaction using the user's credit account, the transaction information may automatically be transmitted to the pre-authorization server by, for example, a transaction server. The transaction server may track user activity relating to a user credit account.

At step 930, the pre-authorization server compares the user's recent account activity to the pre-authorization request. For example, the pre-authorization server may be approved for a pre-authorized transaction for a time duration of 20 minutes. The pre-authorization server may review recent account activity to determine if any activity relating to the user credit account has occurred. Once a time period greater than the requested time duration (i.e., more than 20 minutes) has elapsed, the pre-authorization server may initiate a process for notifying the user that the pre-authorization request has been revoked.

At step 940, the pre-authorization server transmits a pre-authorization update to a user device, for example user device 102. For example, pre-authorization server may transmit a message containing a revocation descriptor, where the revocation descriptor indicates that a pre-authorization request (that was previously granted) has been revoked.

At step 950, the user device displays a pre-authorization revocation message. After the user device receives the pre-authorization update from step 940, the app on the user device may analyze the pre-authorization update, read the revocation descriptor, and cause the screen of the user device to display a message indicating that the pre-authorization request previously approved has been revoked.

In some embodiments, the app may contain logic for tracking an elapsed time from when a pre-authorization request was approved. After a time period greater than the pre-authorized request, the app may cause the screen of the user device to display a message to the user that the time period for approval of the pre-authorization request has elapsed, or may soon elapse. In such embodiments, the user can be warned that the pre-authorization request may be revoked, either immediately or after a short time.

In some embodiments, if there is no activity on a user credit account for more than a length of time, the pre-authorization server may create and transmit a pre-authorization update to the user device in step 940 of FIG. 9. In such embodiments, the pre-authorization server may skip steps 910, 920, and 930.

While various embodiments have been described above, it should be understood that they have been presented by way of example and not limitation. It is to be understood that various changes in form and detail may be made to the embodiments described in the present disclosure, and that alternative embodiments may be implemented, without departing from the spirit and scope. For example, other steps may be provided to (or removed from) the described flows, and other components may be added to (or removed from) the described systems. It is intended that other implementations are within the scope of the present disclosure.

In addition, it should be understood that any figures which highlight the functionality and advantages are presented for exemplary purposes only. The disclosed methods and systems are each flexible and configurable, such that they may be utilized in ways other than that shown in the disclosure.

What is claimed is:

1. A method for providing a one-time pre-authorized credit transaction comprising:
generating, by a user device, a customizable user interface based on information associated with a user, the customizable user interface comprising a plurality of fields comprising a plurality of pre-authorization amount options, the plurality of fields, wherein the plurality of fields are identified based on the information, wherein generating the customizable user interface further comprises configuring the plurality of pre-authorization amount options based on the information, wherein each of plurality of pre-authorization amount options indicate a different pre-authorization amount;
receiving, by the user device, by the customizable user interface a one-time preauthorization request, the one-time pre-authorization request comprising a request identifier, a user identifier, a pre-authorization amount, a transaction duration, and a vendor identifier;
transmitting, by the user device, the pre-authorization request to a pre-authorization server remote from the user device;
receiving, by the pre-authorization server via a network, the one-time pre-authorization request;
analyzing, by the pre-authorization server, the one-time pre-authorization request to identify user information comprising the user identifier, an account identifier, an account amount, an account transaction history, and a user credit score, wherein the account amount is associated with the account identifier, the account identifier is associated with the user identifier, the account transaction history is associated with the account identifier, and the user credit score is associated with the user identifier;
creating, by the pre-authorization server, a pre-authorization response, the pre-authorization response comprising the request identifier, the user identifier, an authorized amount, an authorized transaction duration, and the vendor identifier;
transmitting, by the pre-authorization server via the network, the pre-authorization response to a user device associated with the user identifier, the pre-authorization response indicating the one-time pre-authorization request is approved;
monitoring for one or more transactions associated with at least one of the user identifier and the account identifier;
detecting a transaction associated with the at least one of the user identifier and the account identifier;
analyzing transaction information associated with the transaction, the transaction information comprising an attempted transaction amount, an attempted transaction time, and an attempted transaction vendor identifier; and
based on analyzing the transaction information, generating a transaction response comprising:
processing the transaction when the transaction is attempted before the transaction duration elapses and the transaction amount is less than or equal to the pre-authorization amount;
denying the transaction when the transaction is attempted after the transaction duration elapses or the transaction amount is greater than the pre-authorization amount; and
storing, in a non-transitory computer-readable storage medium, the transaction response in the account transaction history,
wherein allowing the transaction further comprises transmitting, via the network, a transaction allowed notice to the user device, and wherein denying the transaction further comprises transmitting, via the network, a transaction denied notice to the user device.

2. The method for providing the one-time pre-authorized credit transaction of claim 1, further comprising:
detecting an additional transaction associated with the at least one of the user identifier and the account identifier; and
denying the additional transaction.

3. The method for providing the one-time pre-authorized credit transaction of claim 1, further comprising transmitting, by the pre-authorization server, a time expiration message to the user device, the time expiration message indicating to a user of the user device that the pre-authorization request is no longer authorized.

4. The method for providing the one-time pre-authorized credit transaction of claim 3, wherein transmitting the time expiration message is performed after a time period associated with the authorized transaction duration elapses.

5. The method for providing the one-time pre-authorized credit transaction of claim 1, further comprising storing, by the pre-authorization server, the request identifier.

6. The method for providing the one-time pre-authorized credit transaction of claim 1, further comprising transmitting, by the pre-authorization server, a pre-authorization option message to the user device, the pre-authorization option message comprising at least the pre-authorization amount and the transaction duration identifier.

7. The method for providing the one-time pre-authorized credit transaction of claim 1, further comprising:
receiving, by the pre-authorization server, a transaction message, the transaction message comprising the user identifier and a transaction amount;
comparing the transaction amount to the pre-authorization amount; and
transmitting, by the pre-authorization server, a pre-authorization revocation message to the user device, wherein the pre-authorization revocation message indicates to the user of the user device that the user is not authorized for the credit transaction.

8. A system for enabling a one-time pre-authorized credit transaction comprising:
a user device comprising a first processor and a first non-transitory memory storing instructions that, when executed by the first processor, cause the first processor to perform processing comprising:
generating a customizable user interface based on information associated with a user, the customizable user interface comprising a plurality of fields comprising a plurality of pre-authorization amount options, the plurality of fields, wherein the plurality of fields are identified based on the information, wherein generating the customizable user interface further comprises configuring the plurality of pre-authorization amount options based on the information, wherein each of plurality of pre-authorization amount options indicate a different pre-authorization amount;
receiving by the customizable user interface a one-time preauthorization request, the one-time pre-authorization request comprising a request identifier, a user identifier, a pre-authorization amount, a transaction duration, and a vendor identifier;
transmitting, via a network, the pre-authorization request to a pre-authorization server remote from the user device;
the pre-authorization server comprising a second processor and a second non-transitory memory storing instructions that, when executed by the second processor, cause the second processor to perform processing comprising:
receiving, via the network, the one-time pre-authorization request;
analyzing the one-time pre-authorization request to identify user information comprising the user identifier, an account identifier, an account amount, an account transaction history, and a user credit score, wherein the account amount is associated with the account identifier, the account identifier is associated with the user identifier, the account transaction history is associated with the account identifier, and the user credit score is associated with the user identifier;
creating a pre-authorization response, the pre-authorization response comprising the request identifier, the user identifier, an authorized amount, an authorized transaction duration, and the vendor identifier;
transmitting, via the network, the pre-authorization response associated with the user identifier, the pre-authorization response indicating the one-time pre-authorization request is approved;
monitoring for one or more transactions associated with at least one of the user identifier and the account identifier;
detecting a transaction associated with the at least one of the user identifier and the account identifier;
analyzing transaction information associated with the transaction, the transaction information comprising an attempted transaction amount, an attempted transaction time, and an attempted transaction vendor identifier, and
based on analyzing the transaction information, generating a transaction response comprising:
processing the transaction when the transaction is attempted before the transaction duration elapses and the transaction amount is less than or equal to the pre-authorization amount;
denying the transaction when the transaction is attempted after the transaction duration elapses or the transaction amount is greater than the pre-authorization amount; and
storing, in a non-transitory computer-readable storage medium, the transaction response in the account transaction history,
wherein allowing the transaction further comprises transmitting, via the network, a transaction allowed notice, and wherein denying the transaction further comprises transmitting, via the network, a transaction denied notice.

9. The system of claim 8, wherein the instructions executed by the processor are further configured to cause the processor to perform processing comprising:
detecting an additional transaction associated with the at least one of the user identifier and the account identifier; and
denying the additional transaction.

10. The system of claim 8, wherein the instructions executed by the processor are further configured to cause the processor to perform processing comprising transmitting, by the pre-authorization server, a time expiration message, the time expiration message indicating that the pre-authorization request is no longer authorized.

11. The system of claim 10, wherein transmitting the time expiration message is performed after a time period associated with the authorized transaction duration elapses.

12. The system of claim 8, wherein the instructions executed by the processor are further configured to cause the processor to perform processing comprising storing, by the pre-authorization server, the request identifier.

13. The system of claim 8, wherein the instructions executed by the processor are further configured to cause the processor to perform processing comprising transmitting, by the pre-authorization server, a pre-authorization option message, the pre-authorization option message comprising at least the pre-authorization amount and the transaction duration identifier.

14. The system of claim 8, wherein the instructions executed by the processor are further configured to cause the processor to perform processing comprising:
receiving a transaction message, the transaction message comprising the user identifier and a transaction amount;
comparing the transaction amount to the pre-authorization amount; and
transmitting a pre-authorization revocation message, wherein the pre-authorization revocation message indicates that a user is not authorized for the credit transaction.

15. A computer-implemented method for providing a one-time pre-authorized credit transaction comprising:
generating, by a user device, a customizable user interface based on information associated with a user, the customizable user interface comprising a plurality of fields comprising a plurality of pre-authorization amount options, the plurality of fields, wherein the plurality of fields are identified based on the information, wherein generating the customizable user interface further comprises configuring the plurality of pre-authorization amount options based on the information, wherein each of plurality of pre-authorization amount options indicate a different pre-authorization amount;

receiving, by the user device, by the customizable user interface a one-time preauthorization request, the one-time pre-authorization request comprising a request identifier, a user identifier, a pre-authorization amount, a transaction duration, and a vendor identifier;

transmitting, by the user device, the pre-authorization request to a pre-authorization server remote from the user device;

receiving, by the pre-authorization server via a network, the one-time pre-authorization request;

analyzing, by the pre-authorization server, the one-time pre-authorization request to identify user information comprising the user identifier, an account identifier, an account amount, an account transaction history, and a user credit score, wherein the account amount is associated with the account identifier, the account identifier is associated with the user identifier, the account transaction history is associated with the account identifier, and the user credit score is associated with the user identifier;

creating, by the pre-authorization server, a pre-authorization response, the pre-authorization response comprising the request identifier, the user identifier, an authorized amount, an authorized transaction duration, and the vendor identifier;

transmitting, by the pre-authorization server via the network, the pre-authorization response to a user device associated with the user identifier, the pre-authorization response indicating the one-time pre-authorization request is approved;

detecting a transaction associated with the at least one of the user identifier and the account identifier;

analyzing transaction information associated with the transaction, the transaction information comprising an attempted transaction amount, an attempted transaction time, and an attempted transaction vendor identifier; and based on analyzing the transaction information, generating a transaction response comprising:

processing the transaction when the transaction is attempted before the transaction duration elapses;

denying the transaction when the transaction is attempted after the transaction duration elapses; and storing, in a non-transitory computer-readable storage medium, the transaction response in the account transaction history, wherein allowing the transaction further comprises transmitting, via the network, a transaction allowed notice to the user device, and wherein denying the transaction further comprises transmitting, via the network, a transaction denied notice to the user device.

16. The computer-implemented method of claim 15 further comprising:

allowing the transaction when the transaction amount is less than the pre-authorization amount; and denying the transaction when the transaction amount is greater than the pre-authorization amount.

17. The computer-implemented method of claim 15 further comprising:

detecting an additional transaction associated with the at least one of the user identifier and the account identifier; and denying the additional transaction.

18. The computer-implemented method of claim 15 further comprising transmitting, by the pre-authorization server, a time expiration message, the time expiration message indicating that the pre-authorization request is no longer authorized, wherein transmitting the time expiration message is performed after a time period associated with the authorized transaction duration elapses.

19. The computer-implemented method of claim 15 further comprising storing, by the pre-authorization server, the request identifier.

20. The computer-implemented method of claim 15 further comprising transmitting, by the pre-authorization server, a pre-authorization option message, the pre-authorization option message comprising at least the pre-authorization amount and the transaction duration identifier.

* * * * *